United States Patent [19]

Barrett et al.

[11] 4,020,506
[45] Apr. 26, 1977

[54] TAPE CARTRIDGE WITH TRACK POSITION INDICATOR

[75] Inventors: Michael Conan Barrett; Eric Sigfried Petterson, both of Austin, Tex.

[73] Assignee: International Business Machines Corporation, Armonk, N.Y.

[22] Filed: June 30, 1975

[21] Appl. No.: 591,793

[52] U.S. Cl. .................... 360/137; 116/114 J; 116/124 R; 360/106; 360/132

[51] Int. Cl.² ............... G11B 21/10; G11B 23/38

[58] Field of Search ............ 116/124 R, 114 J; 360/77, 78, 105, 75, 106, 137, 132; 33/DIG. 19; 318/602; 340/174 SC; 242/57.1

[56] References Cited

UNITED STATES PATENTS

| | | | |
|---|---|---|---|
| 2,779,826 | 1/1957 | Scott | 360/137 |
| 3,570,735 | 3/1971 | Kurz | 242/57.1 X |
| 3,576,553 | 4/1971 | Hertrich | 360/77 |
| 3,641,529 | 2/1972 | Bitzer et al. | 360/78 X |
| 3,660,810 | 5/1972 | Yoshii | 360/137 |
| 3,723,980 | 3/1973 | Gabor | 360/78 X |
| 3,839,735 | 10/1974 | Denk | 360/106 |
| 3,859,662 | 1/1975 | Habich et al. | 360/106 |

OTHER PUBLICATIONS

Publication "Track Following & Seeking System," by Spruth et al. IBM T. D. Bulletin, vol. 15, No. 10 3/1973 p. 3084.

*Primary Examiner*—Richard C. Queisser
*Assistant Examiner*—Daniel M. Yasich
*Attorney, Agent, or Firm*—Douglas H. Lefeve

[57] ABSTRACT

A magnetic tape cartridge includes a housing for supporting the tape for movement therein and for enclosing a portion of the tape. The tape is expandable from a particular reference point along its width by virtue of temperature and humidity changes. A track position indicator attached to the cartridge includes indicia thereon relative to track positions along the width of the tape. The indicator has a coefficient of expansion closely similar to the coefficient of expansion of the tape, and in the preferred embodiment is made of the same material as the magnetic tape substrate material.

5 Claims, 3 Drawing Figures

TAPE CARTRIDGE WITH TRACK POSITION INDICATOR

BACKGROUND OF THE INVENTION

1. Field of the Invention

This invention relates generally to magnetic tape systems and more particularly to a magnetic tape cartridge including a magnetic tape track position indicator attached thereto.

2. Description of the Prior Art

Various systems have been taught in the prior art to provide for positioning a magnetic head having a single track along the width of a magnetic tape to allow the recording and reading of a plurality of tracks longitudinally recorded on the magnetic tape. U.S. Pat. No. 3,859,662 discloses a transducer track selection apparatus wherein precise positioning of a magnetic head is provided by a toothed rack which cooperates with a single tooth on the magnetic head carrier. The toothed rack, which includes a plurality of teeth each representing a particular recording track position, is included with, and mounted on, the track selection apparatus. Thus, if a tape were recorded on one reader/recorder apparatus and moved to another reader/recorder using a track selection apparatus of the same design, repeatability in accessing appropriate tracks would not be insured, since there could be some variation between the magnetic head position and previously recorded tracks of data on the tape. This variation could occur because of slight differences in the dimensions of the racks at the time of their manufacture, because of differences in the mounting of the racks on the track selection portions of the reader/recorders or because of variations in the orientation of the tape with respect to the reader/recorder.

In the above track selection apparatus it is relatively easy to assure accuracy and repeatability of track accessing when the tracks are relatively wide. In this case, relatively considerable differences could occur between the manufactured dimensions of the toothed rack, or between the mounted positions of the racks, while repeatability and track accessing could be assured. However, as the tracks are made narrower to allow the recording of more tracks along a given width of magnetic tape, the problems of accuracy and repeatability of track accessing become more severe. This is particularly true when it is required that the tapes be changed from one machine to another between reading and recording.

Another problem with the above-described system is one of wear in the track selection apparatus. Obviously, the requirement that a single tooth mechanically engage a toothed rack for each track selection operation causes some degree of wear in the track selection operation that could require the eventual replacement of parts in the apparatus when a large number of track selection operations have been performed. It is known in the prior art to employ a phototransducer assembly in conjunction with a marked, optical mask to provide positioning indications in magnetic head track selection operations. U.S. Pat. No. 3,839,664 is an example of this teaching. However, although the wear problem can be substantially eliminated by utilization of the phototransducer-optical mask system, the consideration of assuring accuracy and repeatability of track accessing when relatively narrow recording tracks are employed and when it is necessary to record the tape on one system and play back the tape on a similar system cannot be ignored. That is, differences in the dimensions of the mask at the time of manufacture or differences in the precise mounting of the mask from one system to another certainly affect accuracy and repeatability of track selection.

In neither of the above systems is any mention made of expansion of the track position indicator (toothed rack or optical mask) because of temperature and/or humidity changes. As track widths become narrower and narrower and more and more closely packed together, significant expansion of the track position indicator and/or the magnetic tape can seriously affect the accuracy or repeatability of selecting a particular, desired track.

It would, therefore, be advantageous to provide reliable track positioning from one system to another, regardless of temperature and/or humidity variations, of a single track magnetic head relative to a multiple track magnetic tape.

SUMMARY OF THE INVENTION

Accordingly, a magnetic tape cartridge is provided for enclosing a portion of the magnetic tape and for supporting the tape for movement within the cartridge. A track position indicator having indicia thereon relative to track positions is attached to the cartridge. The track position indicator has a coefficient of expansion closely similar to the coefficient of thermal and hygroscopic expansion of the magnetic tape.

In a preferred embodiment the magnetic tape is biased toward a fixed plane included with the cartridge such that the tape expands away from the plane with increased temperature and humidity. The track position indicator is also attached at this reference point and is biased away from this reference point for expansion due to increased temperature and humidity. The track position indicator, therefore, always remains with the same tape housed in the cartridge such that changes in the dimensions and corresponding track positions of the tape are duplicated with respect to the track position indicator. In this manner, a high degree of accuracy and repeatability of track selection is assured regardless of the particular one of a plurality of similar reader/recorders chosen for processing the tape and regardless of changes in temperature and humidity from one tape processing operation to the next.

The foregoing and other objects, features, and advantages of the invention will be apparent from the following more particular description of preferred embodiments of the invention, as illustrated in the accompanying drawing.

DETAILED DESCRIPTION OF THE PREFERRED EMBODIMENT

Figure 1:
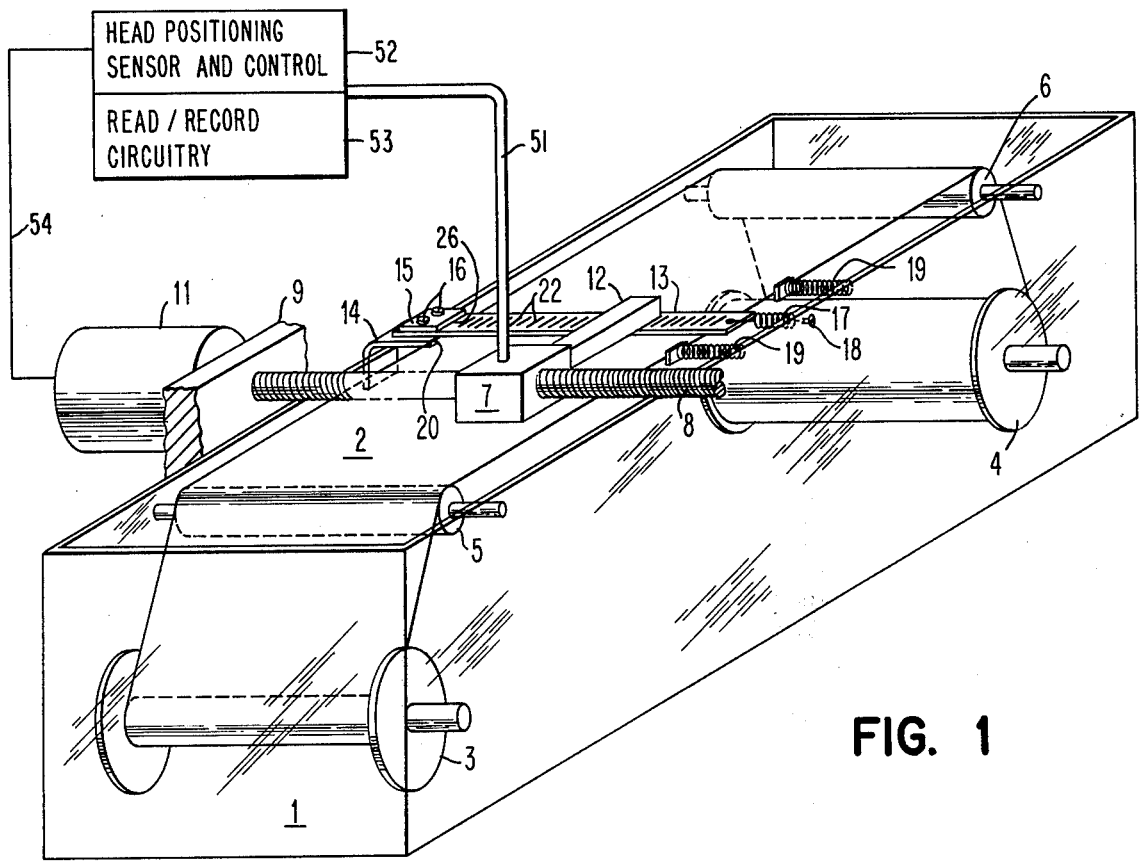
FIG. 1 is a perspective drawing of the magnetic tape cartridge of this invention including the magnetic tape and the track position indicator.

Referring now to FIG. 1, a magnetic tape cartridge 1 is shown. For the purposes of illustration only, cartridge 1 is shown to be transparent; however, the cartridge may, of course, be translucent or opaque. Cartridge 1 partially encloses and supports for movement therein a magnetic tape 2. Magnetic tape 2 is wound in a reel-to-reel fashion about tape reels 3 and 4. Rollers 5 and 6 are included in cartridge 1 to position a plane of the tape 2 relative to an opening in the cartridge 1 for access to the tape by a magnetic head.

A magnetic head carrier 7 encloses a single track magnetic head (not shown) for writing data onto and reading data from tape 2 on a plurality of tracks longitudinally disposed on tape 2 as in U.S. Pat. No. 3,859,662, referenced above. A leadscrew 8 is supported for rotation by bearings in the frame portions 9 of the magnetic tape reader/recorder. A motor 11 may be connected to leadscrew 8 to provide rotation of the leadscrew for causing transverse movement of head carrier 7 along the width of tape 2 for accessing particular tracks thereon.

Also mounted on the head carrier 7 is a light source/photosensor 12 which may, by way of example only, comprise one or more light emitting diodes and one or more phototransistors disposed on opposite sides of a magnetic recording track position indicator strip 13. Signals from light source/photosensor 12, as well as magnetic head read/record signals, are conveyed along cable 51 to head positioning sensor and control logic 52 and magnetic head read/record circuitry 53, the structure of said logic and circuitry being within the skill of the art and not a part of this invention. Motor control signals are output along line 54 from control logic 52 to drive motor 11 approximately to position head carrier 7 via lead screw 8 in accordance with the laterally disposed magnetic recording track positions indicated by indicia 22 on the track position indicator strip 13.

Figure 2:
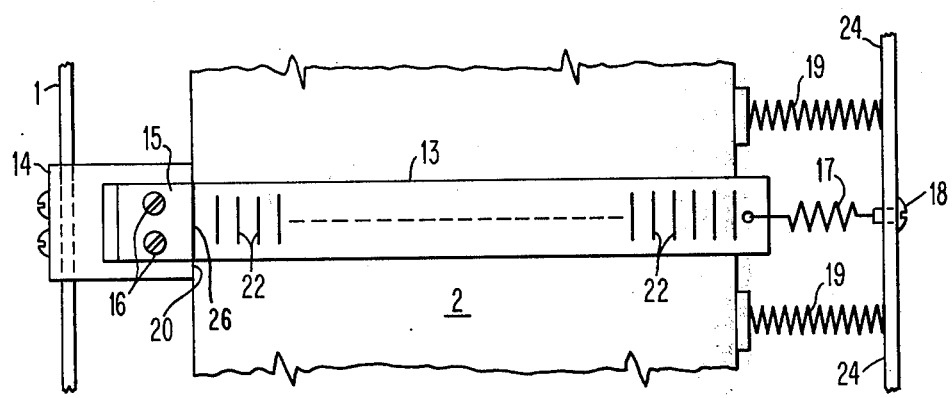
FIG. 2 is an enlarged view of a portion of FIG. 1 showing a reference plane from which the magnetic tape expands and from which the track position indicator is referenced.

Referring now to FIG. 2 as well as to FIG. 1, the track position indicator 13 is attached to the cartridge 1 by means of a mounting bracket 14. At one edge of the bracket 14 is a reference plane surface 20. Compression springs 19, or similar expandable biasing means, are positioned between cartridge wall 24 and the edge of tape 2 opposite to the reference plane surface 20 for biasing tape 2 toward surface 20. In this manner, an edge of tape 2 is always in contact with reference plane surface 20 and expansion of the tape across its width is from surface 20 toward springs 19. The position indicator 13 is also attached to the bracket 14 with a reference position of indicator 13 aligned with the edge of reference plane surface 20 in contact with tape 2. A pair of screws 16 or other attachment means extend through a mounting plate 15, then through the position indicator 13, and into the bracket 14. Plate 15 has an edge aligned with the reference plane surface 20, such that the position indicator 13 is held in compression between plate 15 and bracket 14 with a reference edge 26 on indicator 13 aligned with the reference plane surface 20. Tension spring 17, connected between the opposite end of indicator 13 and a screw 18 extending through wall 24, biases the expandable portion of position indicator 13 away from the surface 20.

The format of the markings on the indicator 13 are chosen in accordance with the configuration of light source/photosensor 12. To assure accuracy and repeatability in track position, however, the materials from which the magnetic tape substrate and the track position indicator are made to have closely similar, or ideally exactly the same, coefficients of expansion with respect to temperature and humidity. More specifically, it has been found that these coefficients of expansion can be assured to be substantially identical by using the same composition of material for the position indicator strip 13 as is used for the substrate of the magnetic tape 2. This material is usually a relatively flexible, polymeric film which may, for example, comprise Mylar (marketed by E. I. du Pont de Nemours and Company).

Figure 3:
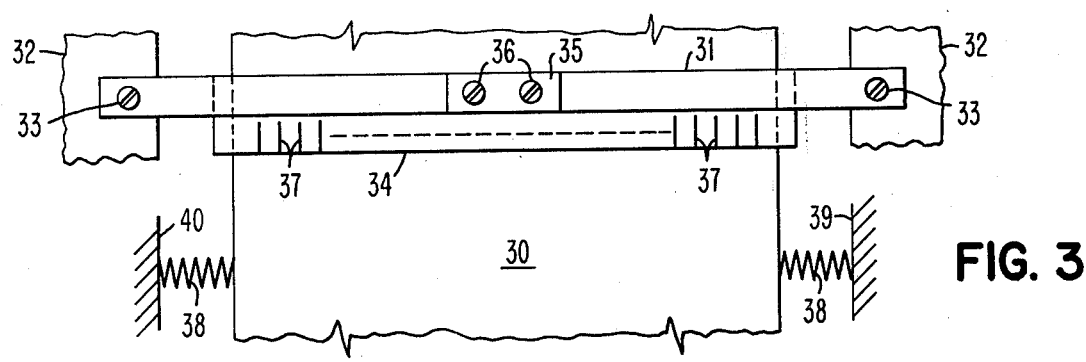
FIG. 3 shows an alternate embodiment wherein the tape and track position indicator expand outwardly from the centers thereof toward the edges thereof.

Referring now to FIG. 3 an alternate embodiment is shown in which the tape and indicator expand from the center outwardly toward both edges rather than from one edge toward an opposite edge as shown in FIGS. 1 and 2. A magnetic tape 30 in FIG. 3 is shown to be biased toward aa center position by compression springs 38 interposed between opposite tape edges and opposite walls 39 and 40 of a cartridge similar to cartridge 1. A track position indicator mounting bar 31 is attached by screws 33 to upper mounting surfaces 32 of a cartridge which may, for example, be similar to cartridge 1. It is assumed that any expansion, contraction, or displacement of the walls and surfaces of cartridge 1 and of bar 31 is negligible compared to the expansion and contraction of the magnetic tape and the track position indicator due to temperature and humidity.

A track position indicator 34 is mounted between a mounting plate 35 and bar 31 by screws 36. The mounting plate 35 is made as narrow as is practical and the screws 36 are positioned as closely together as is practical to best approximate the mounting of strip 34 at a single point. In this manner, position indicator 34 is allowed to freely expand outwardly from the center toward opposite edges.

Again, as in the embodiment shown in FIGS. 1 and 2, the material chosen for position indicator 34 has a coefficient of expansion with respect to temperature and humidity that closely approximates the coefficient of expansion for tape 30. Ideally the tape 30 or the substrate of tape 30 and the position indicator 34 are made of the same material. It may also be helpful to bias the opposite ends of position indicator 34, outwardly, by the addition of small tension springs connected between the ends of indicator 34 and the cartridge edges 32. The track position indicator 34 includes indicia 37 thereon, which cooperate with light sources and photosensors to assure proper orientation of a head carrier and magnetic head relative to a particular, desired track on tape 30.

With reference to the embodiment of FIG. 3, the use of springs 38 to bias tape 30 toward a center position is, of course, not always necessary. That is, tape 30 may, in some instances be made to ride in a center position by utilization of crowned rollers, as is well known to those skilled in the art.

It is further understood that while a reel-to-reel tape system is shown in the preferred embodiments, herein, the invention may be applied to other types of magnetic tape systems, including those utilizing an endless loop, for example.

In summary, a magnetic tape cartridge has been shown which houses a portion of a magnetic tape and supports the magnetic tape for movement therein. A track position indicator is attached to the cartridge for indicating track positions along the width of the tape for the reading and recording of data. The track position indicator is made of a material having a coefficient of thermal and hygroscopic expansion closely similar to the coefficient of expansion of the magnetic tape, itself. The magnetic tape expands and contracts, with reference to changes in temperature and humidity, from a particular, known plane. The track position indicator is mounted to allow similar hygroscopic expansion with changes in temperature and humidity, respectively from the same plane from which the magnetic tape expands and contracts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic tape cartridge comprising:
   a magnetic tape;
   a housing enclosing a portion of said tape and supporting said tape for movement therein;
   one end of a track position indicator attached to said housing, said indicator including indicia thereon indicative of track positions of magnetic recording tracks extending longitudinally along said tape and positioned in substantially parallel relation across a width of said tape, said indicator having a coefficient of thermal and hygroscopic expansion closely similar to the coefficient of thermal and hygroscopic expansion of said magnetic tape; and
   a reference edge surface contacting one edge of said tape, said reference edge surface attached to said housing of said cartridge and said reference edge surface being perpendicular to said tape, the other edge of said tape being spring biased toward said reference edge surface and expandable away from said reference edge surface due to temperature and humidity, said indicator being attached to said housing at said reference edge surface, said tape and said indicator expanding substantially the same amounts in the same direction upon changes in temperature and humidity.

2. The magnetic tape cartridge of claim 1 wherein said indicator is spring biased away from said reference edge surface.

3. The magnetic tape cartridge of claim 2 wherein said indicator and a substrate material of said magnetic tape each comprise a relatively flexible polymeric film of the same composition.

4. A magnetic tape cartridge comprising:
   a magnetic tape;
   a housing enclosing a portion of said tape and supporting said tape for movement therein;
   a mounting bar fixedly mounted between opposing walls of the housing transversely of said tape;
   a mounting plate shorter than said mounting bar;
   a track position indicator having a central portion thereof attached along said mounting bar between said mounting plate and said mounting bar, said attachment of said track position indicator being adjacent a central portion of said magnetic tape between opposite edges of said magnetic tape, said indicator including indicia thereon indicative of track positions of magnetic recording tracks extending longitudinally along said tape, said indicator having a coefficient of thermal and hygroscopic expansion closely similar to the coefficient of thermal and hygroscopic expansion of said magnetic tape; and
   wherein said tape and said indicator expand bidirectionally in substantially the same amounts toward opposite edges along the width of said tape and said track position indicator from said central portions of said tape and said track position indicator upon changes of temperature and humidity.

5. The tape cartridge of claim 4 wherein said indicator and a substrate of said tape comprise a relatively flexible polymeric film of the same composition.

* * * * *